United States Patent
Watanabe

(10) Patent No.: US 11,902,473 B2
(45) Date of Patent: Feb. 13, 2024

(54) IP NETWORK COMMON LINE LINK SETTING DEVICE, IP NETWORK COMMON LINE LINK SETTING METHOD, IP NETWORK COMMON LINE LINK SETTING PROGRAM, AND IP NETWORK COMMON LINE LINK SETTING SYSTEM

(71) Applicant: Nippon Telegraph and Telephone Corporation, Tokyo (JP)

(72) Inventor: Kosuke Watanabe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 8 days.

(21) Appl. No.: 17/801,904

(22) PCT Filed: Feb. 28, 2020

(86) PCT No.: PCT/JP2020/008220
§ 371 (c)(1),
(2) Date: Aug. 24, 2022

(87) PCT Pub. No.: WO2021/171530
PCT Pub. Date: Sep. 2, 2021

(65) Prior Publication Data
US 2023/0026672 A1    Jan. 26, 2023

(51) Int. Cl.
*H04M 7/06* (2006.01)
*H04L 69/085* (2022.01)

(52) U.S. Cl.
CPC .......... *H04M 7/063* (2013.01); *H04L 69/085* (2022.05)

(58) Field of Classification Search
CPC ............................ H04M 7/063; H04L 69/085
See application file for complete search history.

(56) References Cited

U.S. PATENT DOCUMENTS

| | | | |
|---|---|---|---|
| 2003/0016684 A1* | 1/2003 | Prasad | H04Q 3/0025 370/384 |
| 2003/0061388 A1* | 3/2003 | Cleghorn | H04L 69/08 709/236 |
| 2003/0161301 A1* | 8/2003 | Sprague | H04Q 3/0045 370/352 |

OTHER PUBLICATIONS

[No Author Listed] [online], "Stream Control Transmission Protocol," Network Working, Request for Comments: 4960, Sep. 2007, retrieved from URL <https://tools.ietf.org/html/rfc4960>, 152 pages.

(Continued)

*Primary Examiner* — Brenda H Pham
(74) *Attorney, Agent, or Firm* — Fish & Richardson P.C.

(57) ABSTRACT

A link management device with a special function is connected to the IP network, and the link management device controls a process of establishing a link between an IP converter device and a signal transfer point. The IP converter device transmits a request including a point code to the link management device, and the link management device determines the IP address and the like of the signal transfer point as a connection destination from the received point code. The link management device transmits information for identifying the signal transfer point to the IP converter device, and also transmits information for identifying the IP converter device to the signal transfer point as the connection destination. The port number of the IP converter device is determined by the link management device. The port number of the signal transfer point is determined by the link management device.

7 Claims, 12 Drawing Sheets

(56) References Cited

OTHER PUBLICATIONS

[No Author Listed] [online], "TR-1005 SIGTRAN Technology Report," TTC Technology Report, 1st Edition, Feb. 20, 2002, retrieved from URL <https://www.ttc.or.jp/application/files/5415/5435/4555/TR-1005v1.pdf>, 503 pages (with English Translation).

* cited by examiner

| LINK | IP CONVERTER DEVICE (IP ADDRESS:PORT) | IP-STP (IP ADDRESS:PORT) |
|---|---|---|
| A | 192.168.10.1:50000 | 172.10.100.1:50000 |
| B | 192.168.10.1:50001 | 172.10.100.2:50000 |
| C | 192.168.20.1:50000 | 172.10.200.1:50000 |
| D | 192.168.20.1:50001 | 172.10.200.2:50000 |
| a | 192.168.10.1:50000 | 172.10.100.1:50000 |
| b | 192.168.10.1:50001 | 172.10.100.3:50000(ERROR)<br>172.10.100.2:50000(CORRECT) — 221 |
| c | 192.168.20.1:50000 | 172.10.200.1:50000 |
| d | 192.168.20.1:50001 | 172.10.200.2:50000 |

Fig. 5

| POINT CODE | IP-STP (IP ADDRESS) |
|---|---|
| α | 172.10.100.1 |
| α | 172.10.100.2 |
| α | 172.10.100.3 |
| ... | ... |
| β | 172.10.200.1 |
| ... | ... |

Fig. 7
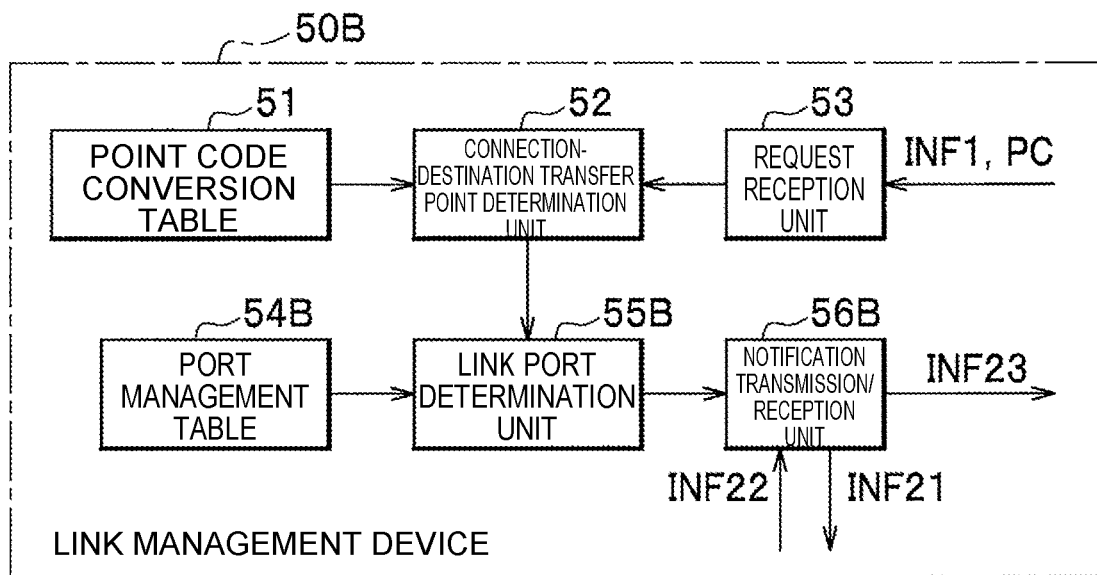
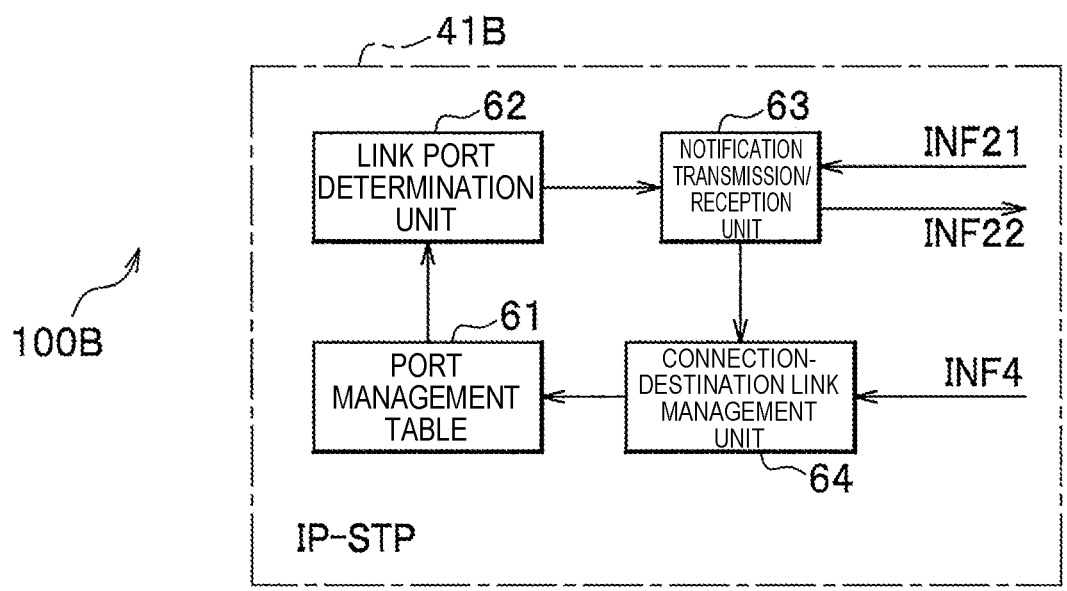

Fig. 9
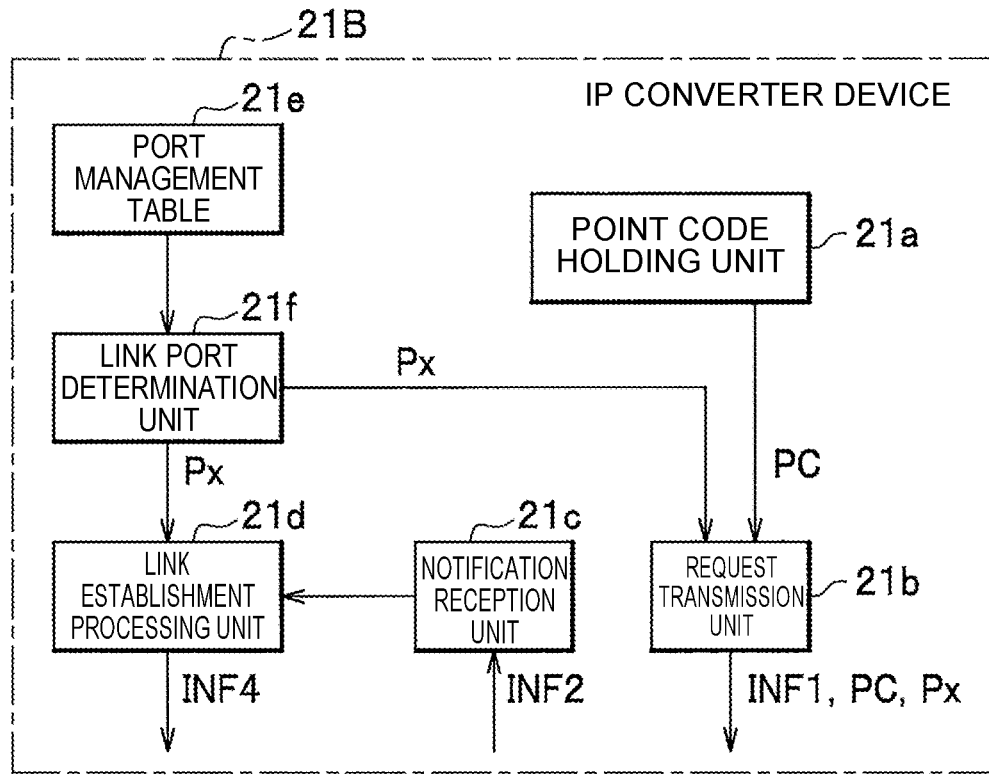
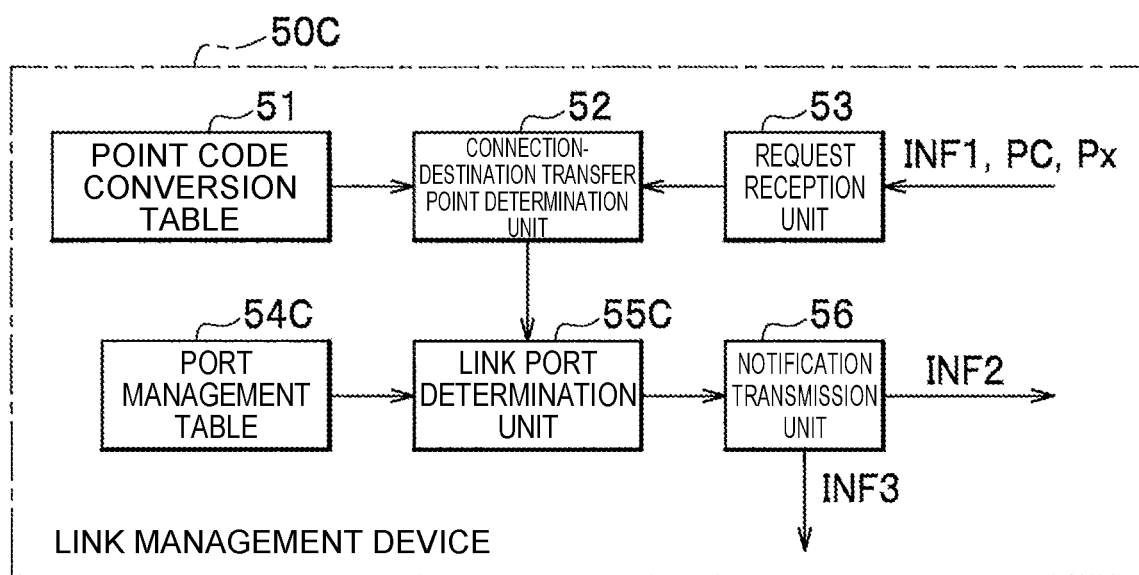

IP NETWORK COMMON LINE LINK SETTING DEVICE, IP NETWORK COMMON LINE LINK SETTING METHOD, IP NETWORK COMMON LINE LINK SETTING PROGRAM, AND IP NETWORK COMMON LINE LINK SETTING SYSTEM

CROSS-REFERENCE TO RELATED APPLICATIONS

This application is a National Stage application under 35 U.S.C. § 371 of International Application No. PCT/JP2020/008220, having an International Filing Date of Feb. 28, 2020. The disclosure of the prior application is considered part of the disclosure of this application, and is incorporated by reference in its entirety into this application.

TECHNICAL FIELD

The present invention relates to an IP network common-channel link setting device, an IP network common-channel link setting method, an IP network common-channel link setting program, and an IP network common-channel link setting system.

BACKGROUND ART

For public switched telephone networks around the world, a common-channel signal is used as a common signaling protocol. That is, a protocol specified as a common-channel signal is used for exchange of control information related to the establishment of a call on a communication path. In the telephone networks currently in use, a common-channel signal is completely separated from voice and is transmitted between exchanges via a network that is independent from that for voice.

Meanwhile, in recent years, construction of a communication network running via an IP (Internet Protocol) network has been considered for transmitting a common-channel signal.

For example, Non-Patent Literature 1 discloses SIGTRAN (signaling transport) as a technique for providing an IP-based common channel. In addition, Non-Patent Literature 2 discloses a technique of an SCTP (Stream Control Transmission Protocol) association (connection) that is necessary for SIGTRAN. For addressing an IP address that is necessary for establishing an SCTP association, determining an IP address from a domain name using a DNS (Domain Name System), for example, is considered.

CITATION LIST

Non-Patent Literature

Non-Patent Literature 1: "TR-1005 Technical report of SIGTRAN," TTC technical report, first edition, established in Feb. 20, 2002, The Telecommunication Technology Committee, the website <URL: https://www.ttc.or.jp/application/files/5415/5435/4555/TR-1005v1.pdf>

Non-Patent Literature 2: R. Stewart, Ed., "Stream Control Transmission Protocol," RFC4960, September, 2007, the website <URL: https://tools.ietf.org/html/rfc4960>

SUMMARY OF THE INVENTION

Technical Problem

FIG. 1 illustrates an exemplary configuration of a communication system 100 that is typically supposed when a common-channel signal is transmitted using a communication network running via an IP network 30. An overview of the communication system 100 in FIG. 1 is described below.

A number of exchanges including exchanges 11 and 12 are disposed in telephone central offices at different locations, for example, for mutually connecting a variety of user terminals, that is, telephones to each other. In addition, in the communication system 100 of FIG. 1, a number of IP converter devices including IP converter devices 21-1, 21-2, 22-1, and 22-2 are disposed at different locations. Further, a number of signal transfer points (IP-STP) including signal transfer points 41-1 to 41-3 and 42-1 to 42-3 supporting the IP network are disposed at different locations.

When one or more of a number of IP converter devices 21-1, 21-2, 22-1, 22-2, . . . is used, it is possible to connect a common-channel signal from each of the exchanges 11, 12, . . . to the IP network 30. In addition, a number of signal transfer points 41-1, 41-2, . . . and 42-1, 42-2, . . . are each connected to the IP network 30. Therefore, each of the IP converter devices 21-1, 21-2, 22-1, 22-2, . . . can connect to the signal transfer points 41-1, 41-2, . . . or 42-1, 42-2, . . . via the IP network 30 and thus can use their relay functions.

A common-channel signal generated by a call from a calling user is, for example, input to the IP network 30 from the first exchange 11 via the first IP converter device 21-1, and is relayed by one signal transfer point 41-1 on the IP network 30, and is then transmitted to a terminal of a called user via the second IP converter device 22-1 and a second exchange 13.

To establish such a connection, it is necessary to allocate appropriate logical links in advance. For example, it is necessary to associate the IP address of and the port to be used by the first IP converter device 21-1 with the IP address of and the port to be used by the signal transfer point 41-1, and further associate the IP address of and the port to be used by the second IP converter device 22-1 with the IP address of and the port to be used by the signal transfer point 41-1.

By the way, in the communication system 100 such as the one illustrated in FIG. 1, it is necessary to increase the communication reliability and continue a communication service even in an emergency, upon occurrence of a failure of a communication facility, or during a maintenance operation, for example. Therefore, redundant communication paths are provided or a communication function is dispersed across a plurality of communication facilities. For example, as illustrated in FIG. 1, a number M of IP converter devices 21-1, 21-2, . . . are disposed in a telephone central office at a given location, and a number M of IP converter devices 22-1, 22-2, . . . are disposed in a telephone central office at another location. It is also supposed that a communication path for ordinary use and a communication path for backup purposes may be prepared at the same time in advance.

Regarding the signal transfer points 41-1 to 41-3, 42-1 to 42-3, . . . also, a plurality of devices are prepared in a building at each location, and a plurality of communication paths are prepared in advance for each device so that the communication paths are dispersed. Further, a case is also supposed in which the signal transfer points 41-1 to 41-3, 42-1 to 42-3, . . . are disposed while being dispersed across a plurality of buildings in each area, or a number K of signal transfer points 41-1 to 41-3, 42-1 to 42-3, . . . are disposed while being dispersed across a plurality of floors in each building.

In the example illustrated in FIG. 1, a plurality of logical links A, B, C, and D are prepared for one common-channel link L1. The plurality of logical links A and B connect the exchange 11 and the IP converter device 21-1 via different independent paths. In addition, a plurality of logical links C and D connect the exchange 11 and the IP converter device 21-2 via different independent paths. Further, a plurality of logical links a and b are prepared between the exchange 12 and the IP converter device 21-1, and a plurality of logical links c and d are prepared between the exchange 12 and the IP converter device 21-2.

Meanwhile, in order to use each of the signal transfer points 41-1 to 41-3, 42-1 to 42-3, . . . , it is necessary, for each of the logical links A, B, C, D, a, b, c, and d, to individually connect the IP converter devices 21-1 and 21-2 and the signal transfer points 41-1 to 41-3 and 42-1 to 42-3 to be used using a plurality of logical links. To this end, it is necessary to allocate the IP address and the port number of each of the IP converter devices 21-1 and 21-2 and the IP address and the port number of each of the signal transfer points 41-1 to 41-3 and 42-1 to 42-3 to each of the logical links A, B, C, D, a, b, c, and d.

As illustrated in FIG. 1, when the plurality of logical links A, B, C, D, and the like are allowed to be used concurrently or selectively for each common-channel link L1, redundant communication paths can be provided. In addition, when the IP converter devices 21-1, 21-2, 22-1, and 22-2 and transfer devices, such as the signal transfer points 41-1 to 41-3 and 42-1 to 42-3, are disposed in a dispersed manner and the plurality of devices are allowed to be used concurrently or selectively, the reliability of the transfer devices can be ensured.

However, when redundant communication paths are provided, redundant transfer devices are provided, and facilities are dispersed across different areas or places to provide a redundant configuration as in the communication system 100 of FIG. 1, the allocation of logical links for accommodating common-channel signals becomes unavoidably very complex. Therefore, a long time would be needed for the operation of designing appropriate logical links for accommodating common-channel signals. Further, to check if the design of each logical link is appropriate, it is necessary to conduct a continuity test while the communication system is actually operated, and such a check operation requires a lot of labor.

FIG. 2 illustrates an exemplary configuration of an information table 200 necessary for generating logical links for a common channel. The information table 200 represents, for each of the logical links A, B, C, D, a, b, c, and d, the correspondence between first information 210 indicating the IP address and the port on the IP converter device side and second information 220 indicating the IP address and the port on the signal transfer point side. For example, regarding the logical link A, FIG. 2 represents that the IP address and the port of the IP converter device 21-1 indicated by the first information 210 are "192.168.10.1" and "50000," respectively, and the IP address and the port of the signal transfer point 41-3 indicated by the second information 220 are "172.10.100.1" and "50000," respectively.

However, the content of the information table 200 such as the one illustrated in FIG. 2 needs to be manually determined by a human. Therefore, when the communication paths are complex, it is highly probable that a lot of labor would be needed and inadvertent errors may occur during setting. In the example of FIG. 2, a case is supposed in which regarding an item 221 allocated to the second information 220 of the logical link b, an erroneous IP address "172.10.100.3" has been registered instead of a correct IP address "172.10.100.2." Therefore, disconnection of a path occurs at a portion of the signal transfer point 41-3 included in the communication path of the logical link b illustrated in FIG. 1 as indicated by a "x mark."

When the communication system 100 is actually operated and a continuity test is conducted, it is determined that the communication path of the logical link b is disconnected. Therefore, it is necessary to later perform the operation of registering the correct IP address "172.10.100.2" in the item 221 of the information table 200 illustrated in FIG. 2 again. Further, since it is necessary to conduct a continuity test again after the correct IP address "172.10.100.2" is registered in the information table 200 again, such an operation is quite difficult to perform and unavoidably requires a lot of labor.

The present invention has been made in view of the foregoing circumstances, and it is an object of the present invention to provide an IP network common-channel link setting device, an IP network common-channel link setting method, an IP network common-channel link setting program, and an IP network common-channel link setting system, all capable of increasing the efficiency of the operation of allocating logical links for accommodating common-channel signals.

Means for Solving the Problem (1) An IP network common-channel link setting device of the present invention is an IP network common-channel link setting device for allocating a plurality of logical links with different paths on a communication system that transfers a common-channel signal for controlling connection between a plurality of exchanges via an IP network, the device including:

a plurality of independent IP converter devices for connecting each exchange to the IP network;

a plurality of signal transfer points connected to the IP network; and a link management device that manages logical links for a common channel on the IP network, in which the link management device includes an address determination unit that defines a correspondence between a point code representing the signal transfer point as a connection destination and an IP address of the corresponding signal transfer point, the link management device has a function of determining at least an IP address of the signal transfer point as the connection destination based on the point code included in a request from the IP converter device and the address determination unit, a function of notifying the IP converter device as a request source of the determined IP address of the signal transfer point, and a function of notifying the determined signal transfer point of information on the IP converter device as the request source, the signal transfer point has a function of allowing connection from the IP converter device based on the information notified by the link management device, and the IP converter device has a function of establishing a link with the signal transfer point determined as the connection destination by the link management device based on the information notified by the link management device.

According to the IP network common-channel link setting device of the present invention, the IP converter device issues a request using the point code, so that the IP converter device can obtain, from the link management device, information, such as the IP address of a connection destination, necessary for establishing a link. In addition, the signal transfer point can obtain, from the link management device, information, such as the IP address of the IP converter device as a request source with which the establishment of a link should be allowed. Therefore, the IP converter device can establish a link with the signal transfer point as the connection destination using the information obtained from the link management device. Accordingly, it is possible to automate the design operation for allocating each logical link and prevent the occurrence of erroneous link allocation, and thus increase the efficiency of the operation related to design and a continuity test.

(2) An IP network common-channel link setting method of the present invention is an IP network common-channel link setting method for allocating a plurality of logical links with different paths on a communication system that transfers a common-channel signal for controlling connection between a plurality of exchanges via an IP network, the method including:

in an environment in which the communication system includes a plurality of independent IP converter devices for connecting each exchange to the IP network, a plurality of signal transfer points connected to the IP network, and a link management device that manages logical links for a common channel on the IP network, transmitting, from the IP converter device to the link management device, at least information on a point code representing the signal transfer point as a connection destination;

determining, with the link management device, an IP address of the signal transfer point as the connection destination based on the point code;

transmitting information on the IP converter device from the link management device to the signal transfer point identified by the determined IP address;

transmitting information on the signal transfer point identified by the determined IP address from the link management device to the IP converter device; and performing communication for establishing a link between the IP converter device and the signal transfer point based on the information received from the link management device.

According to the IP network common-channel link setting method of the present invention, the IP converter device transmits the point code to the link management device, so that the link management device can identify the signal transfer point as a connection destination with which a link should be established. In addition, the signal transfer point can obtain information on the specific IP converter device with which the establishment of a link should be allowed based on the information transmitted from the link management device. Meanwhile, the IP converter device can obtain information on the signal transfer point as the connection destination based on the information transmitted from the link management device. Therefore, it is possible to establish a link between the IP converter device and the IP converter device using the information obtained from the link management device. Accordingly, it is possible to automate the design operation for allocating each logical link and prevent the occurrence of erroneous link allocation, and thus increase the efficiency of the operation related to design and a continuity test.

(3) An IP network common-channel link setting program of the present invention is an IP network common-channel link setting program used for allocating a plurality of logical links with different paths on a communication system that transfers a common-channel signal for controlling connection between a plurality of exchanges via an IP network, the program being executable in an environment in which the communication system includes a plurality of independent IP converter devices for connecting each exchange to the IP network, a plurality of signal transfer points connected to the IP network, and a link management device that manages logical links for a common channel on the IP network, by a predetermined computer that controls the IP converter device, the signal transfer point, and the link management device, the program including:

a procedure of transmitting, from the IP converter device to the link management device, at least information on a point code representing the signal transfer point as a connection destination;

a procedure of determining, with the link management device, an IP address of the signal transfer point as the connection destination based on the point code;

a procedure of transmitting information on the IP converter device from the link management device to the signal transfer point identified by the determined IP address;

a procedure of transmitting information on the signal transfer point identified by the determined IP address from the link management device to the IP converter device; and a procedure of performing communication for establishing a link between the IP converter device and the signal transfer point based on the information received from the link management device.

When the IP network common-channel link setting program of the present invention is executed using a predetermined computer, the IP converter device transmits the point code to the link management device, so that the link management device can identify the signal transfer point as a connection destination with which a link should be established. In addition, the signal transfer point can obtain information on the specific IP converter device with which the establishment of a link should be allowed based on the information transmitted from the link management device. Meanwhile, the IP converter device can obtain information on the signal transfer point as the connection destination based on the information transmitted from the link management device. Therefore, it is possible to establish a link between the IP converter device and the IP converter device using the information obtained from the link management device. Accordingly, it is possible to automate the design operation for allocating each logical link and prevent the occurrence of erroneous link allocation, and thus increase the efficiency of the operation related to design and a continuity test.

(4) An IP network common-channel link setting system of the present invention is an IP network common-channel link setting system including a plurality of exchanges and an IP network for transferring a common-channel signal for controlling connection between the plurality of exchanges, the system being configured to allocate a plurality of logical links with different paths between the plurality of exchanges, the system including:

a plurality of independent IP converter devices for connecting each exchange to the IP network;

a plurality of signal transfer points connected to the IP network; and a link management device that manages logical links for a common channel on the IP network, in which the link management device includes an address determination unit that defines a correspondence between a point code representing the signal transfer point as a connection destination and an IP address of the corresponding signal transfer point, the link management device has a function of determining at least an IP address of the signal transfer point as the connection destination based on the point code included in a request from the IP converter device and the address determination unit, a function of notifying the IP converter device as a request source of the determined IP address of the signal transfer point, and a function of notifying the determined signal transfer point of information on the IP converter device as the request source, the signal transfer point has a function of allowing connection from the IP converter device based on the information notified by the link management device, and the IP converter device has a function of establishing a link with the signal transfer point determined as the connection destination by the link management device based on the information notified by the link management device.

According to the IP network common-channel link setting system of the present invention, the IP converter device issues a request using the point code, so that the IP converter device can obtain, from the link management device, information, such as the IP address of a connection destination, necessary for establishing a link. In addition, the signal transfer point can obtain, from the link management device, information, such as the IP address of the IP converter device as a request source with which the establishment of a link should be allowed. Therefore, the IP converter device can establish a link with the signal transfer point as the connection destination using the information obtained from the link management device. Accordingly, it is possible to automate the design operation for allocating each logical link and prevent the occurrence of erroneous link allocation, and thus increase the efficiency of the operation related to design and a continuity test. Thus, it becomes possible to facilitate the operation necessary for providing an IP-based common-channel link for connecting exchanges.

Effects of the Invention

According to the IP network common-channel link setting device, the IP network common-channel link setting method, the IP network common-channel link setting program, and the IP network common-channel link setting system of the present invention, it is possible to increase the efficiency of the operation of allocating logical links for accommodating common-channel signals. That is, using the link management device can automate the allocation of links and thus can not only simplify the design operation but also prevent the occurrence of human errors during setting. Therefore, the operation of a continuity test, which is conducted while the communication system is operated, can be completed in a short time.

BRIEF DESCRIPTION OF DRAWINGS

FIG. 2 is a schematic diagram illustrating an exemplary configuration of an information table necessary for generating logical links for a common channel.

FIG. 5 is a schematic diagram illustrating an exemplary configuration of a point code conversion table.

FIG. 7 is a block diagram illustrating an exemplary configuration of the main part of an IP network common-channel link setting device according to a second embodiment of the present invention.

FIG. 9 is a block diagram illustrating an exemplary configuration of the main part of an IP network common-channel link setting device according to a third embodiment of the present invention.

DESCRIPTION OF EMBODIMENTS

Embodiments of the present invention will be described hereinafter with reference to the drawings.

First Embodiment

Configuration of Communication System

Figure 1:
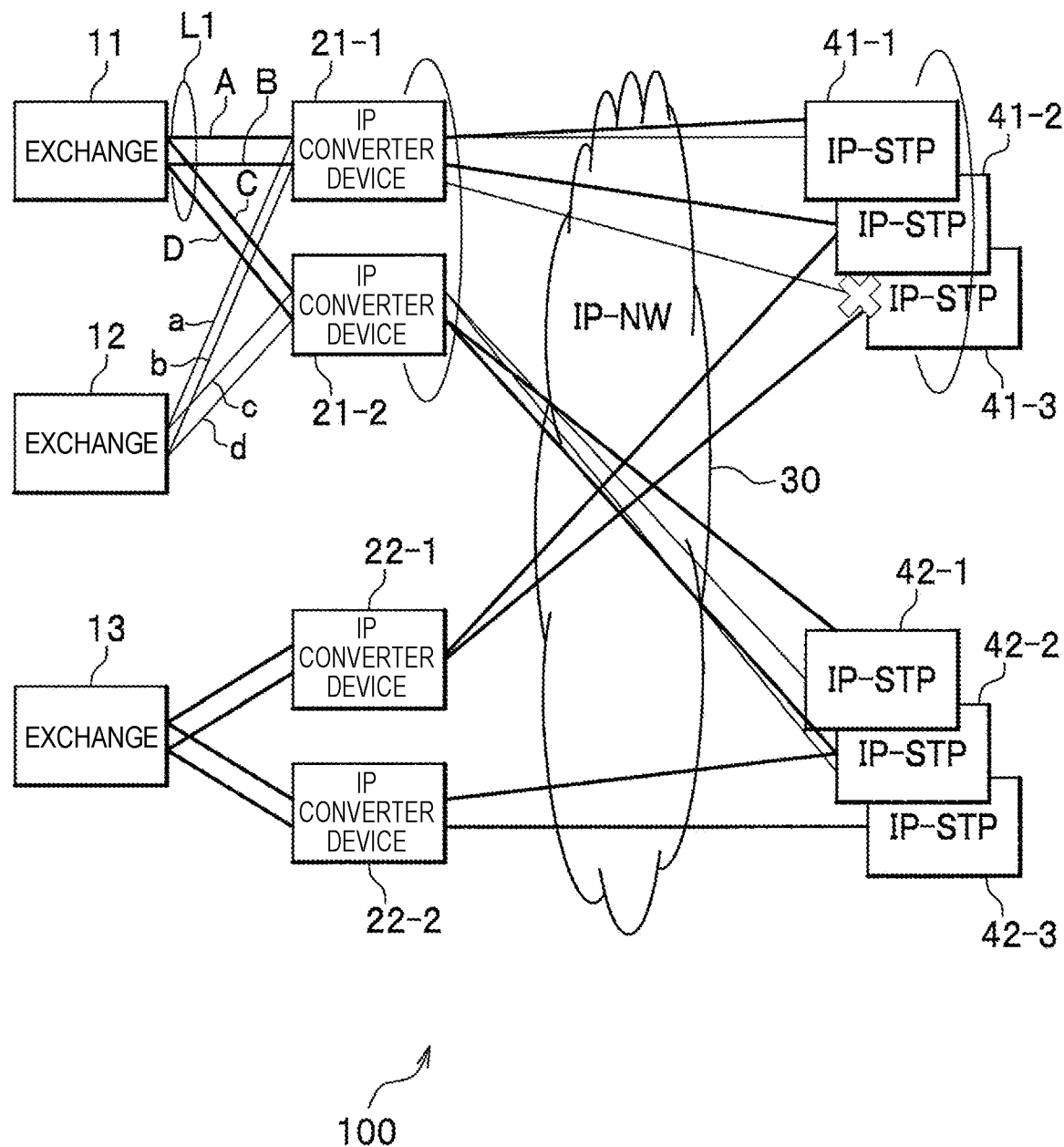
FIG. 1 is a block diagram illustrating an exemplary configuration of a commonly supposed IP-based communication system.
Figure 3:
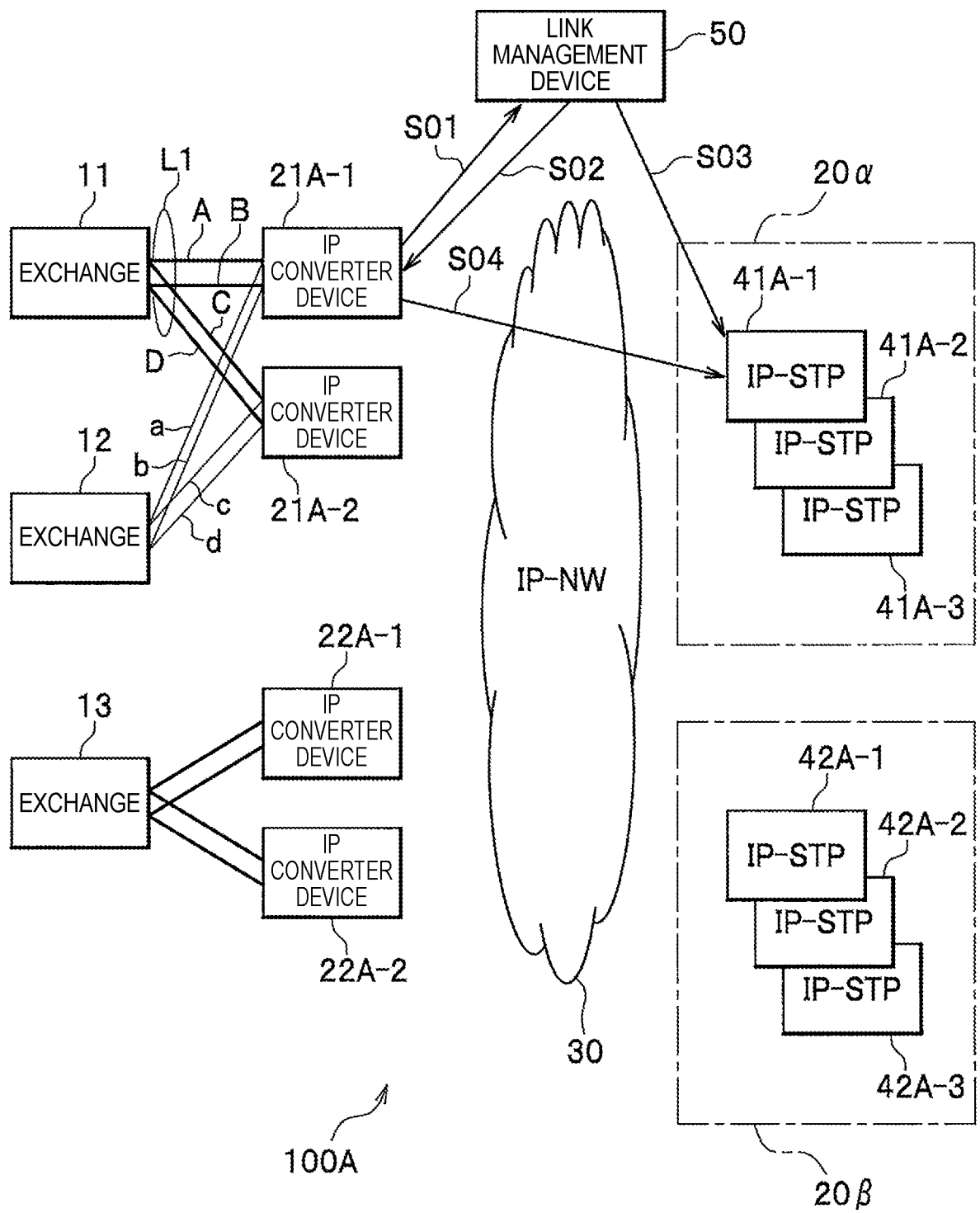
FIG. 3 is a block diagram illustrating an exemplary configuration of a communication system including an IP network common-channel link setting device according to a first embodiment of the present invention.

FIG. 3 illustrates an exemplary configuration of a communication system 100A including an IP network common-channel link setting device according to a first embodiment of the present invention. The communication system 100A in FIG. 3 is described below.

A number of exchanges including exchanges 11 and 12 are disposed in telephone central offices at different locations, for example, for mutually connecting a variety of user terminals, that is, telephones to each other. In addition, in the communication system 100A of FIG. 3, a number of IP converter devices including IP converter devices 21A-1, 21A-2, 22A-1, and 22A-2 are disposed at different locations. That is, a number of IP converter devices 21A-1, 21A-2, 22A-1, and 22A-2 need to be used concurrently or selectively to provide redundant communication paths or disperse the function of a single device.

In addition, a number of signal transfer points (IP-STP) including signal transfer points 41A-1 to 41A-3 and 42A-1 to 42A-3 supporting an IP network (IP-NW) 30 are disposed at different locations.

In the example illustrated in FIG. 3, the plurality of signal transfer points 41A-1 to 41A-3 are disposed in the same building 20α at one location, and the plurality of signal transfer points 42A-1 to 42A-3 are disposed in the same building 20β at another location.

Each of the IP converter devices 21A-1, 21A-2, 22A-1, and 22A-2 is connected to the IP network 30. In addition, each of the signal transfer points 41A-1 to 41A-3 and 42A-1 to 42A-3 is also connected to the IP network 30.

Each of the IP converter devices 21A-1, 21A-2, 22A-1, and 22A-2 has, as a basic function, a function for connecting a common-channel signal from each of the exchanges 11, 12, . . . to the IP network 30. Each of the signal transfer points 41A-1 to 41A-3 and 42A-1 to 42A-3 has a function of relaying a common-channel signal on the IP network 30.

When one or more of a number of IP converter devices 21A-1, 21A-2, 22A-1, 22A-2, . . . is used, it is possible to connect a common-channel signal from each of the exchanges 11, 12, . . . to the IP network 30. Each of the IP converter devices 21A-1, 21A-2, 22A-1, 22A-2, . . . can connect to the signal transfer points 41A-1, 41A-2, . . . or 42A-1, 42A-2, . . . via the IP network 30 and thus can use their relay functions.

In the example of FIG. 3, for forming redundant paths, two links A and B connecting the exchange 11 and the IP converter device 21A-1, and further, two links C and D connecting the exchange 11 and the IP converter device 21A-2 are formed as a common-channel link L1. In addition, two links a and b connecting the exchange 12 and the IP converter device 21A-1 are formed, and further, two links c and d connecting the exchange 12 and the IP converter device 21A-2 are formed.

A common-channel signal generated by a call from a calling user is, for example, input to the IP network 30 from the first exchange 11 via the first IP converter device 21A-1, and is relayed by one signal transfer point 41A-1 on the IP network 30, and is then transmitted to a terminal of a called user via the second IP converter device 22A-1 and the second exchange 13.

To establish such a connection, it is necessary to allocate appropriate logical links in advance. For example, it is necessary to associate the IP address of and the port to be used by the first IP converter device 21A-1 with the IP address of and the port to be used by the signal transfer point 41A-1, and further associate the IP address of and the port to be used by the second IP converter device 22A-1 with the IP address of and the port to be used by the signal transfer point 41A-1.

The communication system 100A illustrated in FIG. 3 includes an IP network common-channel link setting device of the present invention to automate the allocation of logical links between each of the IP converter devices 21A-1, 21A-2, 22A-1, 22A-2, . . . and each of the signal transfer points 41A-1, 41A-2, . . . and 42A-1, 42A-2, . . . . To implement such an IP network common-channel link setting device, the communication system 100A includes a link management device 50 as a device that provides a new function. In addition, each of the IP converter devices 21A-1, 21A-2, 22A-1, 22A-2, . . . and each of the signal transfer points 41A-1, 41A-2, . . . and 42A-1, 42A-2, . . . has a special function for implementing the IP network common-channel link setting device. Such a special function will be described in detail later.

Since the link management device 50 is connected to the IP network 30, the link management device 50 can communicate with each of the IP converter devices 21A-1, 21A-2, 22A-1, 22A-2, . . . via the IP network 30. In addition, the link management device 50 can also communicate with each of the signal transfer points 41A-1, 41A-2, . . . and 42A-1, 42A-2, . . . via the IP network 30.

Communication for establishing logical links can be performed between each of the IP converter devices 21A-1, 21A-2, 22A-1, 22A-2, . . . and each of the signal transfer points 41A-1, 41A-2, . . . and 42A-1, 42A-2, . . . . To enable the establishment of logical links, each of the IP converter devices 21A-1, 21A-2, 22A-1, 22A-2, . . . needs information on the IP address and the port of one of the signal transfer points 41A-1, 41A-2, . . . and 42A-1, 42A-2, . . . as a connection destination. In addition, each of the signal transfer points 41A-1, 41A-2, . . . and 42A-1, 42A-2, . . . needs information on the IP address and the port of a specific IP converter device for which connection should be allowed.

Information needed by each of the IP converter devices 21A-1, 21A-2, 22A-1, 22A-2, . . . and each of the signal transfer points 41A-1, 41A-2, . . . and 42A-1, 42A-2, . . . for establishing logical links can be provided through a process performed by the link management device 50.

To enable the automatic allocation of logical links and the establishment of the logical links, communication such as steps S01, S02, S03, and S04 illustrated in FIG. 3 is sequentially performed, which will be described in detail later. In step S01 of FIG. 3, the IP converter device 21A-1 transmits a request to the link management device 50. In step S02, the link management device 50 notifies the IP converter device 21A-1 of the necessary information in accordance with the request of step S01. In step S03, the link management device 50 notifies the signal transfer point 41A-1 of the necessary information. In step S04, the IP converter device 21A-1 and the signal transfer point 41A-1 communicate with each other for establishing a link using the information notified by the link management device 50, thereby establishing the link.

Detailed Configuration of Main Part

Figure 4:
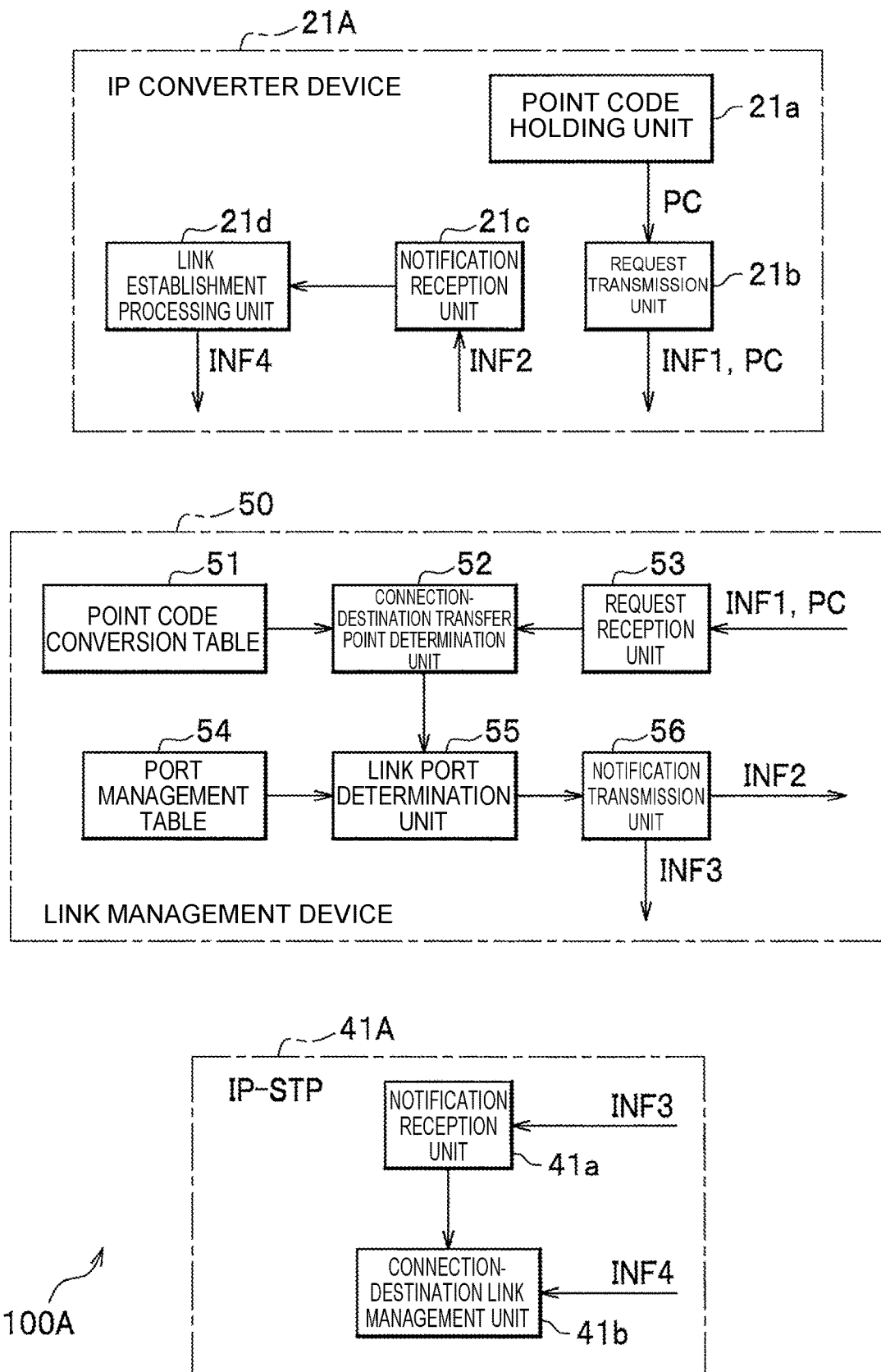
FIG. 4 is a block diagram illustrating an exemplary configuration of the main part of the IP network common-channel link setting device according to the first embodiment of the present invention.

FIG. 4 illustrates an exemplary configuration of the main part of the IP network common-channel link setting device according to the first embodiment of the present invention. That is, each of the IP converter devices 21A-1, 21A-2, 22A-1, 22A-2, . . . illustrated in FIG. 3 has the function of an IP converter device 21A illustrated in FIG. 4. In addition, each of the signal transfer points 41A-1, 41A-2, . . . and 42A-1, 42A-2, . . . illustrated in FIG. 3 has the function of a signal transfer point 41A illustrated in FIG. 4. Further, the link management device 50 forming the main part of the IP network common-channel link setting device has a function illustrated in FIG. 4.

It should be noted that each of the IP converter device 21A, the link management device 50, and the signal transfer point 41A illustrated in FIG. 4 is formed by hardware and software of a computer with an IP communication function, and such software incorporates a special program necessary for implementing the present invention.

As illustrated in FIG. 4, the IP converter device 21A includes a point code holding unit 21a, a request transmission unit 21b, a notification reception unit 21c, and a link establishment processing unit 21d.

The point code holding unit 21a holds information on one or more point codes PC determined in advance. The point code PC refers to information allocated to one spot, such as the building 20α or 20β illustrated in FIG. 3, for example. Needless to say, the point code PC may be allocated to each spot other than a building.

The request transmission unit 21b transmits a request to the link management device 50 to collect information necessary for establishing a logical link. Information INF1 on the request includes information on one point code PC. Alternatively, the information on the point code PC is transmitted together with the information INF'.

The notification reception unit 21c receives a notification about information INF2 transmitted from the link management device 50 in response to the request, and obtains the information INF2.

The link establishment processing unit 21d performs a communication process for establishing a link with one signal transfer point 41A as a connection destination, using the information INF2 received and obtained by the notification reception unit 21c, and thus establishes the link based on information INF4.

As illustrated in FIG. 4, the link management device 50 includes a point code conversion table 51, a connection-destination transfer point determination unit 52, a request reception unit 53, a port management table 54, a link port determination unit 55, and a notification transmission unit 56.

The point code conversion table 51 holds information representing the IP address of each of one or more of the signal transfer points 41A allocated to each point code PC. Specific examples of the point code conversion table 51 are described below.

The request reception unit 53 receives the information INF1 on the request and the point code PC from each IP converter device 21A via the IP network 30.

The connection-destination transfer point determination unit 52, based on the value of the point code PC included in the request received by the request reception unit 53, determines information including one IP address representing the location of a specific signal transfer point 41A, using the point code conversion table 51.

The port management table 54 manages and holds each of information on one or more unused port numbers that can be used for each IP converter device 21A to perform IP communication, and information on one or more unused port numbers that can be used for each signal transfer point 41A to perform IP communication.

The link port determination unit 55 determines each of the port number of the IP converter device 21A and the port number of the signal transfer point 41A, which are to be used for establishing a link between the IP converter device 21A as a request source and the signal transfer point 41A, using the port management table 54.

The notification transmission unit 56 transmits the information INF2 needed by the IP converter device 21A as a request source to the IP converter device 21A for notification. In addition, the notification transmission unit 56 transmits information INF3 needed by a specific signal transfer point 41A, which has been determined by the connection-destination transfer point determination unit 52, to the signal transfer point 41A for notification. The information INF2 includes the IP address and the port number of the signal transfer point 41A. The information INF3 includes the IP address and the port number of the IP converter device 21A as a request source.

As illustrated in FIG. 4, the signal transfer point 41A includes a notification reception unit 41a and a connection-destination link management unit 41b.

The notification reception unit 41a receives and obtains the information INF3 notified by the link management device 50 via the IP network 30.

The connection-destination link management unit 41b performs a process for establishing a link with the IP converter device 21A as a request source based on the content of the information INF3 obtained by the notification reception unit 41a from the link management device 50 and the information INF4 transmitted from the IP converter device 21A as a request source to establish the link.

Configuration of Point Code Conversion Table

FIG. 5 illustrates an exemplary configuration of the point code conversion table 51.

The point code conversion table 51 illustrated in FIG. 5 holds data representing the correspondence between first information 51a and second information 51b determined in advance. The first information 51a represents one point code PC, and the second information 51b represents the IP address of one of a number of signal transfer points 41A.

In the example illustrated in FIG. 5, the value α of a single point code PC is associated with a plurality of different IP addresses "172.10.100.1," "172.10.100.2," "172.10.100.3," . . . . In addition, the value β of another point code PC is associated with an IP address "172.10.200.1."

The values α and β of the point codes PC in FIG. 5 can be associated with spots, such as the buildings 20a and 20β in FIG. 3, respectively, for example. Therefore, when there are a plurality of signal transfer points 41A-1 to 41A-3 in one building 20a, for example, it is possible to easily identify each of the plurality of signal transfer points 41A-1 to 41A-3 in the building 20a from the value α of the point code PC, using the point code conversion table 51.

Process Procedures

Figure 6:
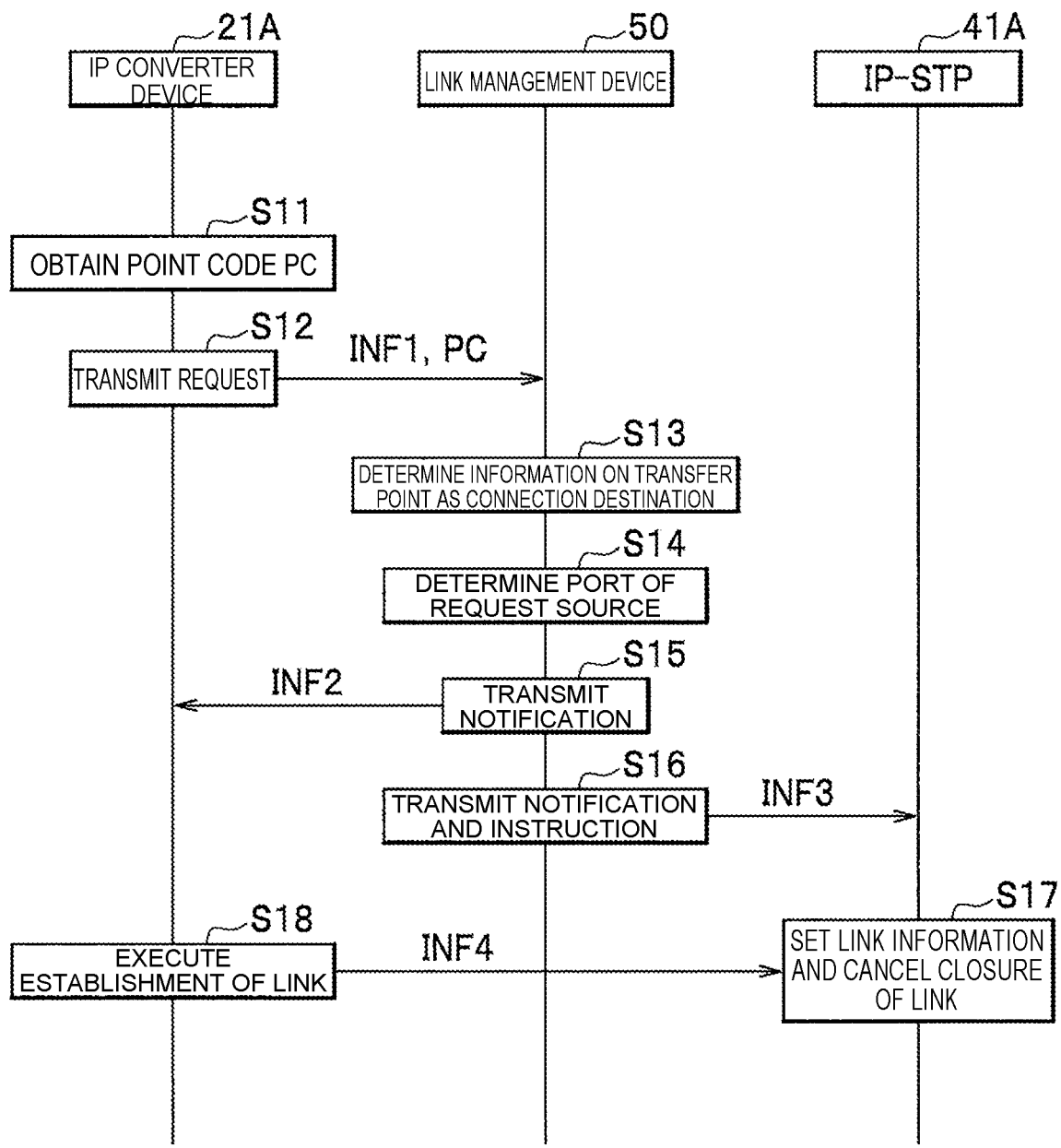
FIG. 6 is a sequence diagram representing the procedures of a representative process of the IP network common-channel link setting device according to the first embodiment of the present invention.

FIG. 6 illustrates the procedures of a representative process of the IP network common-channel link setting device according to the first embodiment of the present invention. The procedures illustrated in FIG. 6 represent the procedures of the operation and communication of each of the IP converter device 21A, the link management device 50, and the signal transfer point 41A illustrated in FIG. 4. The procedures in FIG. 6 are described below.

In step S11, the request transmission unit 21b of the IP converter device 21A obtains one point code PC from the point code holding unit 21a. In step S12, the request transmission unit 21b transmits to the link management device 50 the information INF1 and the point code PC as a request. Accordingly, the IP converter device 21A requests for the IP address and the port number of the signal transfer point 41A as a connection destination as well as the port number to be used by the IP converter device 21A.

In step S13, the connection-destination transfer point determination unit 52 of the link management device 50 determines the IP address of one signal transfer point 41A based on the value of the point code PC included in the request from the IP converter device 21A, using the point code conversion table 51. In addition, the link port determination unit 55 determines the port number of the signal transfer point 41A using the port management table 54.

It should be noted that when the value of a single point code PC is associated with a plurality of signal transfer points 41A in the point code conversion table 51, the connection-destination transfer point determination unit 52 randomly selects one of the plurality of signal transfer points 41A. The link port determination unit 55 selectively designates one of unused ports of the signal transfer point 41A, which has been determined by the connection-destination transfer point determination unit 52, from the port management table 54.

In step S14, the link port determination unit 55 selectively designates one of unused ports of the IP converter device 21A as a request source from the port management table 54.

In step S15, the notification transmission unit 56 of the link management device 50 notifies the IP converter device 21A as a request source of information on the port number of the IP converter device 21A, which has been determined in step S14, as the information INF2.

The notification transmission unit 56 of the link management device 50 transmits a notification and an instruction as the information INF3 to the signal transfer point 41A as a connection destination determined in step S13. The information INF3 includes the IP address and the port number of the request source as well as the port number of the signal transfer point 41A determined in step S13.

In step S17, the signal transfer point 41A sets link information and cancels the closure of the set link in accordance with the instruction of the information INF3. That is, the signal transfer point 41A performs a process for setting a link with the IP converter device 21A as a request source indicated by the link management device 50.

The IP converter device 21A can, from the information INF2 notified by the link management device 50, obtain the port number to be used by the IP converter device 21A as well as the IP address and the port number indicating the signal transfer point 41A as a connection destination. In step S18, the IP converter device 21A transmits the information INF4 to the designated signal transfer point 41A in accordance with the information INF2, and thus establishes a logical link with the signal transfer point 41A. That is, the IP converter device 21A executes the establishment of an SCTP (Stream Control Transmission Protocol) association.

Second Embodiment

Configuration of Communication System

The configuration of a communication system 100B according to a second embodiment of the present invention is similar to that of the communication system 100A in FIG. 3 except for a link management device 50B and a signal transfer point 41B illustrated in FIG. 7. The main part of the IP network common-channel link setting device of the second embodiment includes the link management device 50B and the signal transfer point 41B illustrated in FIG. 7 and the signal transfer point 41A illustrated in FIG. 4.

The main feature of the second embodiment is that the signal transfer point 41B side has a function of designating a port of the signal transfer point 41B when a link between the signal transfer point 41A and the signal transfer point 41B is allocated.

The link management device 50B illustrated in FIG. 7 includes the point code conversion table 51, the connection-destination transfer point determination unit 52, the request reception unit 53, a port management table 54B, a link port determination unit 55B, and a notification transmission/reception unit 56B.

The function of each of the point code conversion table 51, the connection-destination transfer point determination unit 52, and the request reception unit 53 illustrated in FIG. 7 is the same as that in the first embodiment.

The port management table 54B manages only information on the port numbers of each IP converter device 21A. The link port determination unit 55B, in response to a request from the IP converter device 21A, determines the port number to be used by the IP converter device 21A as a request source based on the content of the port management table 54B. Accordingly, one port number is selectively designated from among a number of unused ports.

The notification transmission/reception unit 56B has functions of transmitting information INF21 to the signal transfer point 41B, receiving information INF22 from the signal transfer point 41B, and transmitting information INF23 to the IP converter device 21A. The information INF21 includes an instruction about a link, and the information INF22 includes the designated port number of the signal transfer point 41B. The information INF23 includes the port number of the IP converter device 21A and the IP address and the port number of the signal transfer point 41B.

The signal transfer point 41B illustrated in FIG. 7 has the functions of a port management table 61, a link port determination unit 62, a notification transmission/reception unit 63, and a connection-destination link management unit 64.

The port management table 61 manages the port numbers of a plurality of ports for IP communication of the signal transfer point 41B while distinguishing whether each port is being used or not being used.

The link port determination unit 62 has a function of, upon receiving an instruction about a link, selecting one port from among unused ports managed by the port management table 61 and determining the selected port as an allocation destination.

The notification transmission/reception unit 63 receives from the link management device 50B the information INF21 on an instruction about a link. In addition, the notification transmission/reception unit 63 transmits to the link management device 50B the information INF22 on the port number determined by the link port determination unit 62.

The connection-destination link management unit 64 performs a process for establishing a link with the IP converter device 21A as a request source based on the content of the information INF21 obtained by the notification transmission/reception unit 63 from the link management device 50B and the information INF4 transmitted from the IP converter device 21A as a request source to establish the link.

Process Procedures

Figure 8:
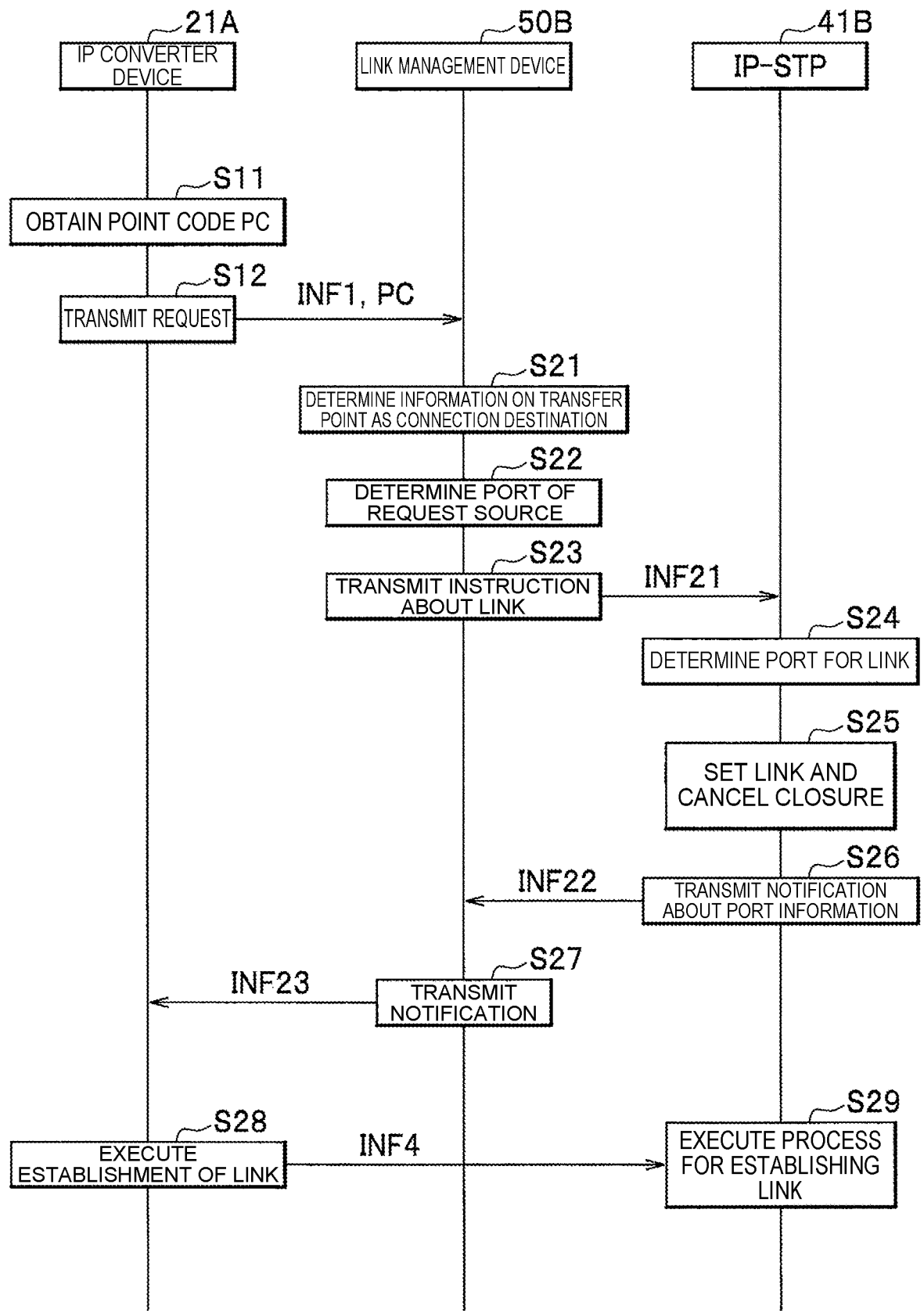
FIG. 8 is a sequence diagram representing the procedures of a representative process of the IP network common-channel link setting device according to the second embodiment of the present invention.

FIG. 8 illustrates the procedures of a representative process of the IP network common-channel link setting device according to the second embodiment of the present invention. The procedures illustrated in FIG. 8 represent the procedures of the operation and communication of each of the IP converter device 21A illustrated in FIG. 4 and the link management device 50B and the signal transfer point 41B illustrated in FIG. 7. The procedures in FIG. 8 are described below.

In step S11, the request transmission unit 21b of the IP converter device 21A obtains one point code PC from the point code holding unit 21a. In step S12, the request transmission unit 21b transmits to the link management device 50 the information INF1 and the point code PC as a request. Accordingly, the IP converter device 21A requests for the IP address and the port number of the signal transfer point 41B as a connection destination as well as the port number to be used by the IP converter device 21A.

In step S21, the connection-destination transfer point determination unit 52 of the link management device 50B determines the IP address of one signal transfer point 41B based on the value of the point code PC included in the request from the IP converter device 21A, using the point code conversion table 51. In step S22, the link port determination unit 55 selectively designates one of unused ports of the IP converter device 21A as a request source from the port management table 54.

In step S23, the notification transmission/reception unit 56B of the link management device 50B transmits the information INF21 to the signal transfer point 41B as a connection destination, and provides an instruction about a link. The information INF21 includes the IP address and the port number of the IP converter device 21A as a request source.

The signal transfer point 41B, upon receiving the information INF21 from the link management device 50B, executes processes of steps S24, S25, S26, and S29 in accordance with the instruction about a link. In step S24, the link port determination unit 55B selectively designates one of unused ports as the port number of the signal transfer point 41B to be used for the link. In step S25, the connection-destination link management unit 64 executes a process of setting a link and cancelling the closure of the link based on the port designated in step S24 and information on the request source indicated by the information INF21. In step S26, the notification transmission/reception unit 63 notifies the link management device 50B of the port number determined in step S24 as the information INF22.

In step S27, the notification transmission/reception unit 56B of the link management device 50B notifies the IP converter device 21A as a request source of the information INF23. The information INF23 includes the IP address of the signal transfer point 41B determined by the link management device 50B in step S21, the port number of the IP converter device 21A determined in step S22, and the port number of the signal transfer point 41B included in the received information INF22.

The IP converter device 21A can obtain, from the information INF23 notified by the link management device 50, the port number to be used by the IP converter device 21A as well as the IP address and the port number indicating the signal transfer point 41B as a connection destination. In step S28, the IP converter device 21A transmits the information INF4 to the designated signal transfer point 41B in accordance with the information INF23, and thus establishes a logical link with the signal transfer point 41B. That is, the IP converter device 21A executes the establishment of an SCTP association.

Since the signal transfer point 41B as a connection destination has set the link and cancelled the closure of the link in step S25, in step S29, the signal transfer point 41B can establish a link with the IP converter device 21A as a request source using the port number of the signal transfer point 41B determined in step S24 in accordance with the received information INF4.

Since the communication system 100B in FIG. 7 executes the procedures illustrated in FIG. 8, the port number to be used by the signal transfer point 41B for a link to be allocated can be determined on the side of the signal transfer point 41B. In addition, in the communication system 100B, the link management device 50B need not be provided with a function of determining the port number to be used by the signal transfer point 41B.

Third Embodiment

Configuration of Communication System

The configuration of a communication system 100C according to a third embodiment of the present invention is similar to that of the communication system 100A in FIG. 3 except for an IP converter device 21B and a link management device 50C illustrated in FIG. 9. The main part of the IP network common-channel link setting device of the third embodiment includes the IP converter device 21B and the link management device 50C illustrated in FIG. 9 and the signal transfer point 41A illustrated in FIG. 4.

The main feature of the third embodiment is that the IP converter device 21B side has a function of designating a port number to be used by the IP converter device 21B when a link between the IP converter device 21B and the signal transfer point 41A is allocated.

The IP converter device 21B illustrated in FIG. 9 includes the point code holding unit 21a, the request transmission unit 21b, the notification reception unit 21c, the link establishment processing unit 21d, a port management table 21e, and a link port determination unit 21f.

Each of the functions of the point code holding unit 21a, the request transmission unit 21b, the notification reception unit 21c, and the link establishment processing unit 21d included in the IP converter device 21B illustrated in FIG. 9 is almost the same as that in the first embodiment.

The port management table 21e of the IP converter device 21B manages each of a number of ports that can be used for IP communication between the IP converter device 21B and the signal transfer point 41A, and holds information for distinguishing whether each port is being used or not being used for each port number.

The link port determination unit 21f has a function of, based on the information managed by the port management table 21e, selectively designating a port number to be used by the IP converter device 21B to perform IP communication with the signal transfer point 41A from among the unused ports.

The link management device 50C illustrated in FIG. 9 includes the point code conversion table 51, the connection-destination transfer point determination unit 52, the request reception unit 53, a port management table 54C, a link port determination unit 55C, and the notification transmission unit 56.

Each of the functions of the point code conversion table 51, the connection-destination transfer point determination unit 52, the request reception unit 53, and the notification transmission unit 56 illustrated in FIG. 9 is almost the same as that in the first embodiment.

The port management table 54C manages, for the ports of each of a number of available signal transfer points 41A, the statuses of a number of ports that can be used for IP communication between the IP converter device 21B and the signal transfer point 41A, and holds information for distinguishing whether each port is being used or not being used for each port number.

The link port determination unit 55C has a function of, in response to a request from the IP converter device 21B, selectively designating a port number to be used by the signal transfer point 41A as a connection destination from among unused ports based on the content of the port management table 54C.

Process Procedures

Figure 10:
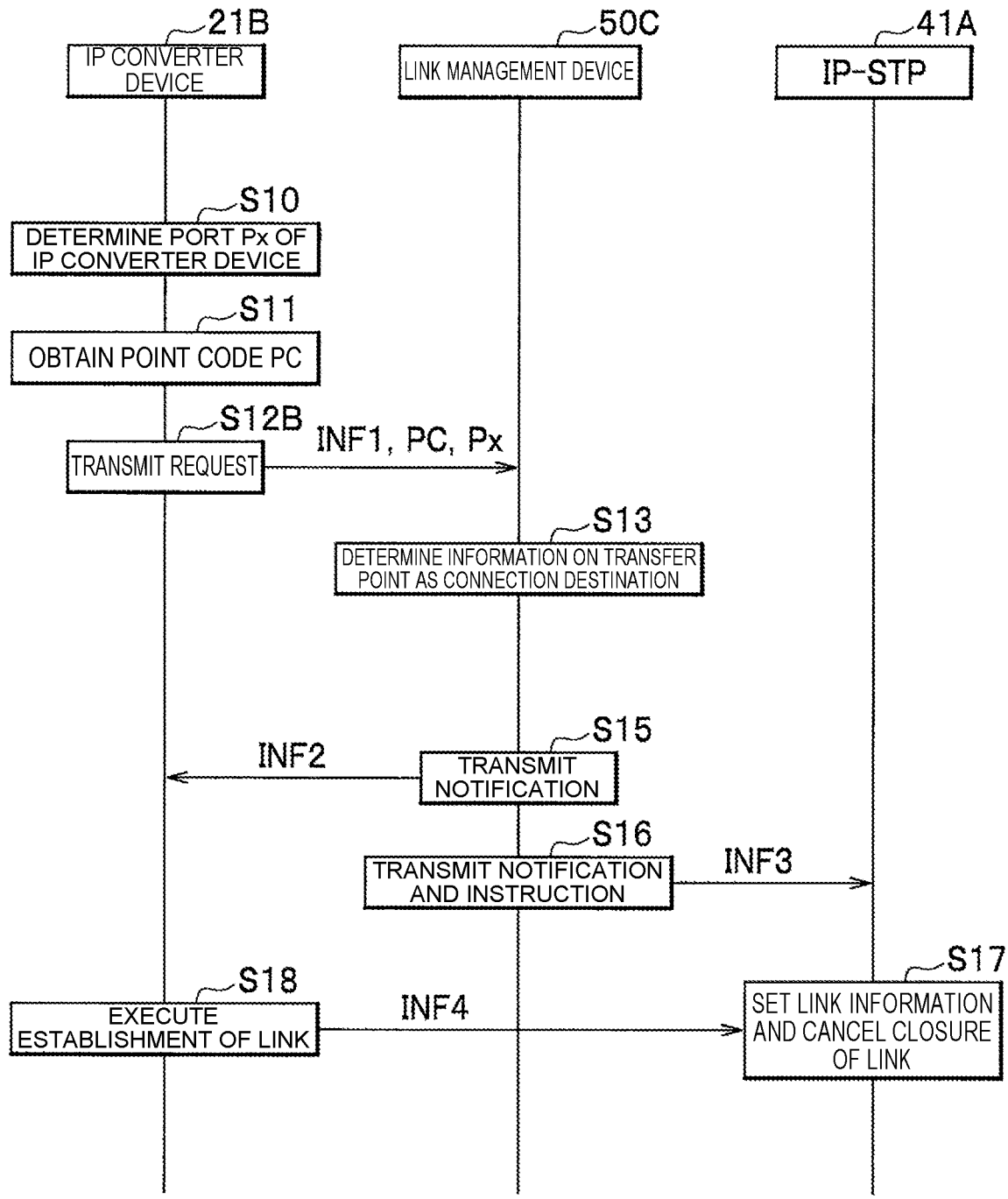
FIG. 10 is a sequence diagram representing the procedures of a representative process of the IP network common-channel link setting device according to the third embodiment of the present invention.

FIG. 10 illustrates the procedures of a representative process of the IP network common-channel link setting device according to the third embodiment of the present invention. The procedures illustrated in FIG. 10 represent the procedures of the operation and communication of each of the IP converter device 21B and the link management device 50C illustrated in FIG. 9 and the signal transfer point 41A illustrated in FIG. 4. The procedures in FIG. 10 are described below.

In step S10, the link port determination unit 21*f* of the IP converter device 21B determines the port number Px of a port to be used by the IP converter device 21B for communication with the signal transfer point 41A as a connection destination.

In step S11, the request transmission unit 21*b* of the IP converter device 21B obtains one point code PC from the point code holding unit 21*a*.

In step S12B, the request transmission unit 21*b* of the IP converter device 21B transmits to the link management device 50C the information INF1, the point code PC, and the port number Px as a request. That is, the IP converter device 21B requests for the IP address and the port number of the signal transfer point 41A as a connection destination.

In step S13, the connection-destination transfer point determination unit 52 of the link management device 50C determines the IP address of one signal transfer point 41A based on the value of the point code PC included in the request from the IP converter device 21B, using the point code conversion table 51. In addition, the link port determination unit 55C determines the port number of the signal transfer point 41A using the port management table 54C.

It should be noted that when the value of a single point code PC is associated with a plurality of signal transfer points 41A in the point code conversion table 51, the connection-destination transfer point determination unit 52 randomly selects one of the plurality of signal transfer points 41A. The link port determination unit 55C selectively designates one of unused ports of the signal transfer point 41A, which has been determined by the connection-destination transfer point determination unit 52, from the port management table 54C.

In step S15, the notification transmission unit 56 of the link management device 50C notifies the IP converter device 21B of the information INF2. The information INF2 includes the IP address and the port number of the signal transfer point 41A as a connection destination designated in step S13.

In step S15, the notification transmission unit 56 of the link management device 50C transmits the information INF3 to the signal transfer point 41A as a connection destination. The information INF3 includes the port number of the signal transfer point 41A designated in step S13 as well as the IP address and the port number Px of the IP converter device 21B as a request source.

In step S17, the signal transfer point 41A sets link information and cancels the closure of the set link in accordance with the instruction of the information INF3 transmitted from the link management device 50C. That is, the signal transfer point 41A performs a process for setting a link with the IP converter device 21B as a request source indicated by the link management device 50C.

The IP converter device 21B can, from the information INF2 notified by the link management device 50C, obtain the IP address and the port number indicating the signal transfer point 41A as a connection destination. In step S18, the IP converter device 21B transmits the information INF4 to the designated signal transfer point 41A in accordance with the information INF2, and thus establishes a logical link with the signal transfer point 41A. That is, the IP converter device 21B executes the establishment of an SCTP association.

Fourth Embodiment

Configuration of Communication System

Figure 11:
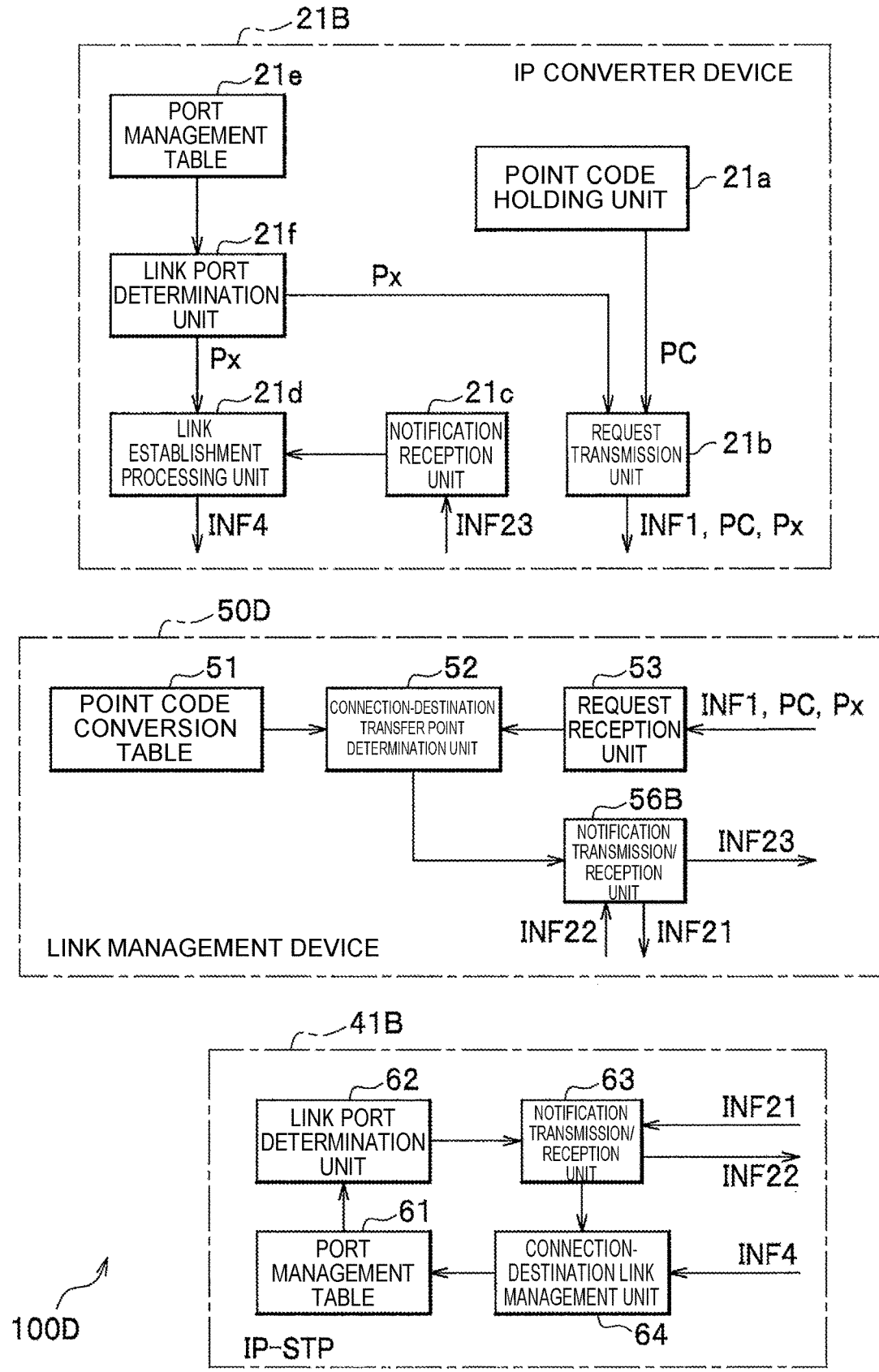
FIG. 11 is a block diagram illustrating an exemplary configuration of the main part of an IP network common-channel link setting device according to a fourth embodiment of the present invention.

FIG. 11 illustrates the configuration of an IP network common-channel link setting device of a communication system 100D according to a fourth embodiment of the present invention. That is, the main part of the IP network common-channel link setting device of the fourth embodiment includes the IP converter device 21B, a link management device 50D, and the signal transfer point 41B illustrated in FIG. 11.

The main feature of the fourth embodiment is that the IP converter device 21B side has a function of designating a port number to be used by the IP converter device 21B, and further, the signal transfer point 41B has a function of designating a port number to be used by the signal transfer point 41B when a link between the IP converter device 21B and the signal transfer point 41B is allocated.

The IP converter device 21B illustrated in FIG. 11 includes the point code holding unit 21*a*, the request transmission unit 21*b*, the notification reception unit 21*c*, the link establishment processing unit 21*d*, the port management table 21*e*, and the link port determination unit 21*f*.

Each of the functions of the point code holding unit 21*a*, the request transmission unit 21*b*, the notification reception unit 21*c*, and the link establishment processing unit 21*d* included in the IP converter device 21B illustrated in FIG. 11 is almost the same as that in the first embodiment.

The port management table 21*e* of the IP converter device 21B manages each of a number of ports that can be used for IP communication between the IP converter device 21B and the signal transfer point 41B, and holds information for distinguishing whether each port is being used or not being used for each port number.

The link port determination unit 21*f* has a function of, based on the information managed by the port management table 21*e*, selectively designating a port number to be used by the IP converter device 21B to perform IP communication with the signal transfer point 41B from among the unused ports.

The link management device 50D illustrated in FIG. 11 includes the point code conversion table 51, the connection-destination transfer point determination unit 52, the request reception unit 53, and the notification transmission/reception unit 56B.

The function of each of the point code conversion table 51, the connection-destination transfer point determination unit 52, and the request reception unit 53 illustrated in FIG. 11 is almost the same as that in the first embodiment.

The notification transmission/reception unit 56B has functions of transmitting information INF21 to the signal transfer point 41B, receiving information INF22 from the signal transfer point 41B, and transmitting information INF23 to the IP converter device 21B. The information INF21 includes an instruction about a link of the link management device 50D, and the information INF22 includes the designated port number of the signal transfer point 41B. The information INF23 includes the IP address and the port number of the signal transfer point 41B as a connection destination.

The signal transfer point 41B illustrated in FIG. 11 has the functions of the port management table 61, the link port determination unit 62, the notification transmission/reception unit 63, and the connection-destination link management unit 64.

The port management table 61 manages the port number of each of a plurality of ports for IP communication of the signal transfer point 41B while distinguishing whether each port is being used or not being used.

The link port determination unit 62 has a function of, upon receiving an instruction about a link, selectively designating one port from among unused ports managed by the port management table 61.

The notification transmission/reception unit 63 receives from the link management device 50D the information INF21 on an instruction about a link. In addition, the notification transmission/reception unit 63 transmits to the link management device 50D the information INF22 on the port number determined by the link port determination unit 62.

The connection-destination link management unit 64 performs a process for establishing a link with the IP converter device 21B as a request source based on the content of the information INF21 obtained by the notification transmission/reception unit 63 from the link management device 50D and the information INF4 transmitted from the IP converter device 21B as a request source to establish the link.

In the communication system 100D in FIG. 11, the port number to be used by the IP converter device 21B for a link to be allocated can be determined on the side of the IP converter device 21B. In addition, the link management device 50C need not be provided with a function of determining the port number to be used by the IP converter device 21B.

Process Procedures

Figure 12:
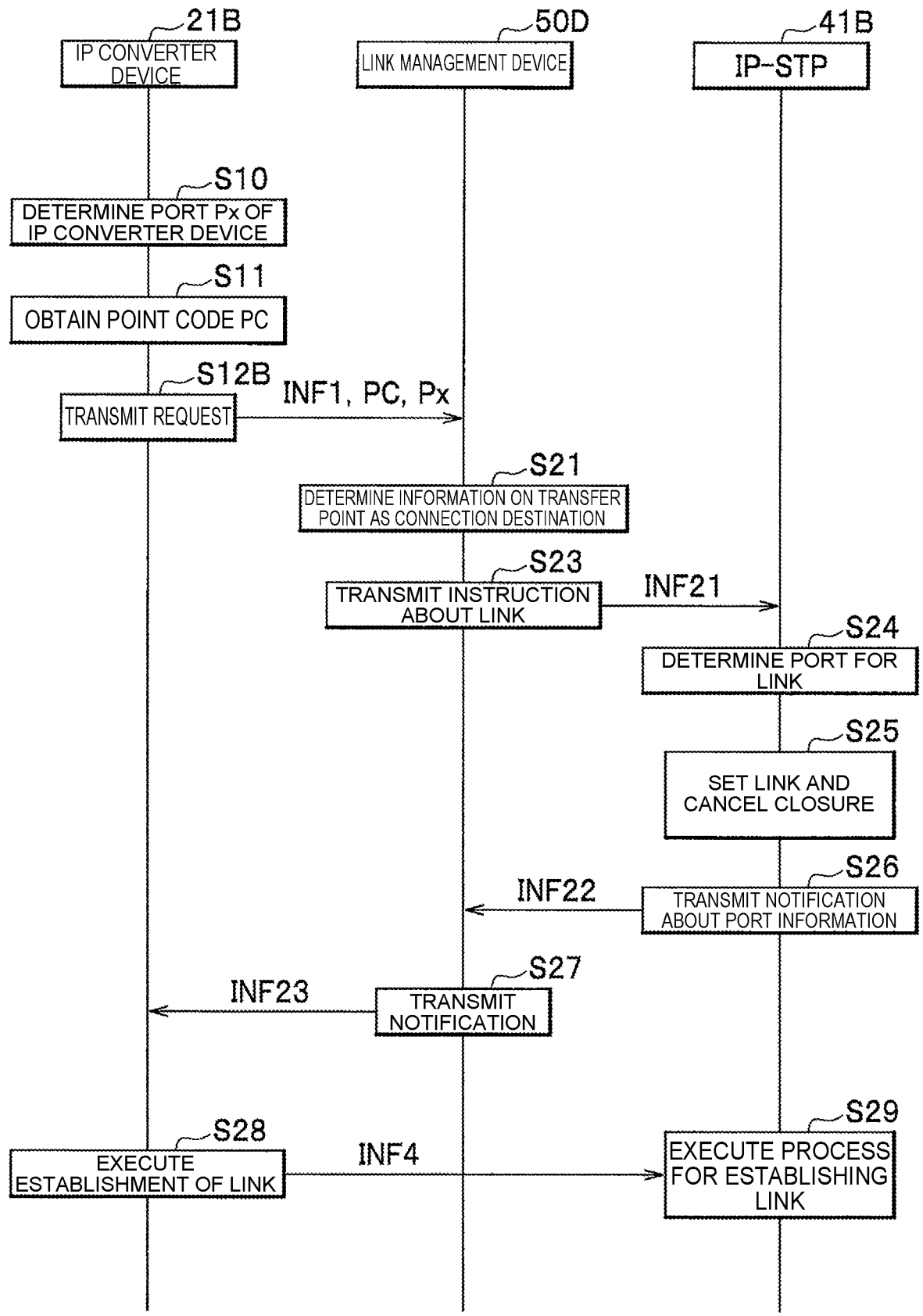
FIG. 12 is a sequence diagram representing the procedures of a representative process of the IP network common-channel link setting device according to the fourth embodiment of the present invention.

FIG. 12 illustrates the procedures of a representative process of the IP network common-channel link setting device according to the fourth embodiment of the present invention. The procedures illustrated in FIG. 12 represent the procedures of the operation and communication of each of the IP converter device 21B, the link management device 50D, and the signal transfer point 41B illustrated in FIG. 11. The procedures in FIG. 12 are described below.

In step S10, the link port determination unit 21f of the IP converter device 21B designates one port number Px to be used for a link from among unused ports of the IP converter device 21B based on the content of the port management table 21e.

In step S11, the request transmission unit 21b of the IP converter device 21B obtains information on one point code PC from the point code holding unit 21a.

In step S12B, the request transmission unit 21b of the IP converter device 21B transmits to the link management device 50D the information INF1, the point code PC, and the port number Px as a request. That is, the IP converter device 21B requests the link management device 50D to send the IP address and the port number of the signal transfer point 41B as a connection destination.

In step S21, the connection-destination transfer point determination unit 52 of the link management device 50D determines the IP address of one signal transfer point 41B based on the value of the point code PC included in the request from the IP converter device 21B, using the point code conversion table 51. It should be noted that when the designated one point code PC is associated with a plurality of signal transfer points 41B in the point code conversion table 51, the connection-destination transfer point determination unit 52 randomly designates one signal transfer point 41B from among the plurality of signal transfer points 41B.

In step S23, the notification transmission/reception unit 56B of the link management device 50D transmits the information INF21 to the signal transfer point 41B as a connection destination, and provides an instruction about a link. The information INF21 includes the IP address and the port number Px of the IP converter device 21B as a request source.

The signal transfer point 41B, upon receiving the information INF21 from the link management device 50D, executes processes of steps S24, S25, S26, and S29 in accordance with the instruction about a link. In step S24, the link port determination unit 62 selectively designates one of unused ports as the port number of the signal transfer point 41B to be used for the link. In step S25, the connection-destination link management unit 64 executes a process of setting a link and cancelling the closure of the link based on the port designated in step S24 and information on the request source indicated by the information INF21. In step S26, the notification transmission/reception unit 63 notifies the link management device 50D of the port number determined in step S24 as the information INF22.

In step S27, the notification transmission/reception unit 56B of the link management device 50B notifies the IP converter device 21B as a request source of the information INF23. The information INF23 includes the IP address of the signal transfer point 41B determined by the link management device 50D in step S21 and the port number of the signal transfer point 41B included in the received information INF22.

The IP converter device 21B can obtain, from the information INF23 notified by the link management device 50D, the IP address and the port number indicating the signal transfer point 41B as a connection destination. In step S28, the IP converter device 21B transmits the information INF4 to the designated signal transfer point 41B in accordance with the information INF23, and thus establishes a logical link with the signal transfer point 41B. That is, the IP converter device 21B executes the establishment of an SCTP association.

Since the signal transfer point 41B as a connection destination has set the link and cancelled the closure of the link in step S25, in step S29, the signal transfer point 41B can establish a link with the signal transfer point 41B using the port number of the signal transfer point 41B determined in step S24 in accordance with the received information INF4.

Since the communication system 100D in FIG. 11 executes the procedures illustrated in FIG. 12, the port number to be used by the signal transfer point 41B for a link to be allocated can be determined on the side of the signal transfer point 41B. In addition, in the communication system 100D, the port number Px to be used by the IP converter device 21B as a request source can be determined on the side of the IP converter device 21B. Therefore, the link management device 50D need not be provided with a function of determining the port number to be used by the signal transfer point 41B and the port number Px to be used by the IP converter device 21B.

It should be noted that the IP network common-channel link setting program of the present invention is incorporated into the communication system 100A illustrated in FIG. 4, for example, as a combination of a plurality of programs to be executed by computer bodies that implement the respective functions of the IP converter device 21A, the link management device 50, and the signal transfer point 41A.

The configuration of each program and the combination of the plurality of programs are changed according to the configuration and the required function of the entire system. That is, the IP network common-channel link setting program of the present invention is configured to be capable of executing one of the procedures illustrated in FIGS. 6, 8, 10, and 12 on a predetermined computer.

In each of the aforementioned first embodiment, second embodiment, third embodiment, and fourth embodiment, using the link management device 50, 50B, 50C, or 50D can automate the establishment of a link between the IP converter device 21A or 21B and the signal transfer point 41A or 41B. Therefore, there is no need for a designer to create the allocation for setting a link like the information table 200 illustrated in FIG. 2. Thus, the efficiency of the design operation for an IP-based common channel can be increased. In addition, even when the structure of the communication system 100 has become very complex, the occurrence of human errors during setting can be prevented. Thus, the operation of a continuity test, which is conducted while the communication system is operated, can be completed in a short time.

In the configuration illustrated in FIG. 4, the link management device 50 can centrally manage the port numbers of the IP converter device 21A and the port numbers of the signal transfer point 41A when a link between the IP converter device 21A and the signal transfer point 41A is set.

In the configuration illustrated in FIG. 7, the link management device 50B can centrally manage the port numbers of the IP converter device 21A when a link between the IP converter device 21A and the signal transfer point 41B is set, while the signal transfer point 41B can manage each port number of the signal transfer point 41B.

In the configuration illustrated in FIG. 9, the IP converter device 21B can manage each port number of the IP converter device 21B when a link between the IP converter device 21B and the signal transfer point 41A is set, while the link management device 50C can centrally manage the port numbers of the signal transfer point 41A.

In the configuration illustrated in FIG. 11, the IP converter device 21B can manage each port number of the IP converter device 21B when a link between the IP converter device 21B and the signal transfer point 41B is set, while the signal transfer point 41B can manage each port number of the signal transfer point 41B.

REFERENCE SIGNS LIST 11, 12, 13 Exchange
20α, 20β Building
21A, 21A-1, 21A-2, 22A-1, 22A-2 IP converter device
21B IP converter device
21a Point code holding unit
21b Request transmission unit
21c Notification reception unit
21d Link establishment processing unit
21e Port management table
21f Link port determination unit
30 IP network
41A, 41A-1, 41A-2, 41A-3 Signal transfer point
41B Signal transfer point
42A-1, 42A-2, 42A-3 Signal transfer point
41a Notification reception unit
41b Connection-destination link management unit
50, 50B, 50C, 50D Link management device
51 Point code conversion table
51a First information
51b Second information
52 Connection-destination transfer point determination unit
53 Request reception unit
54, 54B, 54C Port management table
55, 55B, 55C Link port determination unit
56 Notification transmission unit
56B Notification transmission/reception unit
61 Port management table
62 Link port determination unit
63 Notification transmission/reception unit
64 Connection-destination link management unit
100, 100A, 100B, 100C, 100D Communication system
INF1, INF2, INF3, INF4, INF21, INF22 Information
L1 Common-channel link
PC Point code
Px Port number

The invention claimed is:

1. An IP network common-channel link setting device for allocating a plurality of logical links with different paths on a communication system that transfers a common-channel signal for controlling connection between a plurality of exchanges via an IP network, the device comprising:
a plurality of independent IP converter devices for connecting each exchange to the IP network;
a plurality of signal transfer points connected to the IP network;
a link management device that manages logical links for a common channel on the IP network;
a processor; and
a memory device storing instructions that, when executed by the processor, cause the processor to perform operations comprising:
defining a correspondence between a point code representing the signal transfer point as a connection destination and an IP address of the corresponding signal transfer point,
determining at least an IP address of the signal transfer point as the connection destination based on the point code included in a request from the IP converter device and notifying the IP converter device as a request source of the determined IP address of the signal transfer point, and notifying the determined signal transfer point of information on the IP converter device as the request source,
allowing connection from the IP converter device based on the information notified by the link management device, and
establishing a link with the signal transfer point determined as the connection destination by the link management device based on the information notified by the link management device.

2. The IP network common-channel link setting device according to claim 1, wherein the operations comprise:
determining a first port to be used by the IP converter device as the request source for each link, and a second port determination unit that determines a second port to be used by the signal transfer point as the connection destination for the link, and
notifying the IP converter device and the signal transfer point of information on the first port and information on the second port.

3. The IP network common-channel link setting device according to claim 1, wherein the operations comprise:
determining a first port to be used by the IP converter device as the request source for each link, determining a second port to be used for the link in response to an instruction from the link management device, notifying the link management device of information on the second port, and notifying the IP converter device and the signal transfer point of information on the first port, receiving the information on the second port from the signal transfer point and notifying the IP converter device of the information on the second port.

4. The IP network common-channel link setting device according to claim 1, wherein the operations comprise:

determining a first port to be used for each link to be established with the signal transfer point as the connection destination, determining a second port to be used by the signal transfer point for the link, notifying the link management device of information on the first port, notifying the signal transfer point of information on the first port and information on the second port and notifying the IP converter device of information on the second port.

5. The IP network common-channel link setting device according to claim 1, wherein determining a first port to be used for each link to be established with the signal transfer point as the connection destination notifying the link management device of information on the first port, determining a second port to be used for the link, notifying the link management device of information on the second port, notifying the signal transfer point of the information on the first port received from the IP converter device, and notifying the IP converter device of the information on the second port received from the signal transfer point.

6. An IP network common-channel link setting method for allocating a plurality of logical links with different paths on a communication system that transfers a common-channel signal for controlling connection between a plurality of exchanges via an IP network, the method comprising:

in an environment in which the communication system includes a plurality of independent IP converter devices for connecting each exchange to the IP network, a plurality of signal transfer points connected to the IP network, and a link management device that manages logical links for a common channel on the IP network, transmitting, from the IP converter device to the link management device, at least information on a point code representing the signal transfer point as a connection destination;

determining, with the link management device, an IP address of the signal transfer point as the connection destination based on the point code;

transmitting information on the IP converter device from the link management device to the signal transfer point identified by the determined IP address;

transmitting information on the signal transfer point identified by the determined IP address from the link management device to the IP converter device; and performing communication for establishing a link between the IP converter device and the signal transfer point based on the information received from the link management device.

7. An IP network common-channel link setting program used for allocating a plurality of logical links with different paths on a communication system that transfers a common-channel signal for controlling connection between a plurality of exchanges via an IP network, the program being executable in an environment in which the communication system includes a plurality of independent IP converter devices for connecting each exchange to the IP network, a plurality of signal transfer points connected to the IP network, and a link management device that manages logical links for a common channel on the IP network, by a predetermined computer that controls the IP converter device, the signal transfer point, and the link management device, the program comprising:

transmitting, from the IP converter device to the link management device, at least information on a point code representing the signal transfer point as a connection destination;

determining, with the link management device, an IP address of the signal transfer point as the connection destination based on the point code;

transmitting information on the IP converter device from the link management device to the signal transfer point identified by the determined IP address;

transmitting information on the signal transfer point identified by the determined IP address from the link management device to the IP converter device; and performing communication for establishing a link between the IP converter device and the signal transfer point based on the information received from the link management device.

* * * * *